(12) United States Patent
Peng et al.

(10) Patent No.: US 11,248,842 B2
(45) Date of Patent: Feb. 15, 2022

(54) CONTINUOUS DRYING APPARATUS FOR BEE POLLEN AND RELATED DRYING METHOD

(71) Applicant: INSTITUTE OF APICULTURAL RESEARCH CHINESE ACADEMY OF AGRICULTURAL SCIENCES, Beijing (CN)

(72) Inventors: Wenjun Peng, Beijing (CN); Xiaoming Fang, Beijing (CN); Liming Wu, Beijing (CN); Wenli Tian, Beijing (CN); Lingyu Gao, Beijing (CN); Yazhou Zhao, Beijing (CN); Yuemin Tong, Beijing (CN); Hongwei Xiao, Beijing (CN); Shengming Han, Beijing (CN)

(73) Assignee: INSTITUTE OF APICULTURAL RESEARCH CHINESE ACADEMY OF AGRICULTURAL SCIENCES, Beijing (CN)

( * ) Notice: Subject to any disclaimer, the term of this patent is extended or adjusted under 35 U.S.C. 154(b) by 0 days.

(21) Appl. No.: 16/620,801

(22) PCT Filed: Jun. 7, 2018

(86) PCT No.: PCT/CN2018/090284
§ 371 (c)(1),
(2) Date: Dec. 9, 2019

(87) PCT Pub. No.: WO2019/153609
PCT Pub. Date: Aug. 15, 2019

(65) Prior Publication Data
US 2021/0293479 A1    Sep. 23, 2021

(30) Foreign Application Priority Data

Feb. 12, 2018    (CN) .......................... 201810146548.5

(51) Int. Cl.
*F26B 5/04* (2006.01)
*F24F 3/14* (2006.01)
(Continued)

(52) U.S. Cl.
CPC ................ *F26B 5/041* (2013.01); *F24F 3/14* (2013.01); *F25B 30/00* (2013.01); *F26B 17/04* (2013.01);
(Continued)

(58) Field of Classification Search
CPC .......... F26B 5/041; F26B 17/04; F26B 23/00; F26B 23/10; F25B 30/00; F24F 3/14; F24F 2003/144
(Continued)

(56) References Cited

U.S. PATENT DOCUMENTS 1,678,711 A * 7/1928 Shipman ................. F26B 17/04
34/524
3,160,483 A * 12/1964 Bardet ....................... B01J 8/08
34/236
(Continued)

FOREIGN PATENT DOCUMENTS

| CN | 1956758 | 5/2007 | |
| CN | 202734453 | * 2/2013 | .............. F26B 5/041 |

(Continued)

*Primary Examiner* — John P McCormack
(74) *Attorney, Agent, or Firm* — IP & T Group LLP

(57) ABSTRACT

The present invention relates to the technical field of bee product processing, and discloses a continuous drying apparatus for bee pollen and related drying method. The continuous drying apparatus for bee pollen comprises: a box body; a first drying conveying structure; a second drying conveying structure; and a heat pump dehumidification heating structure. The continuous drying apparatus for bee pollen has the advantage of high drying efficiency.

14 Claims, 3 Drawing Sheets

(51) Int. Cl.
*F25B 30/00* (2006.01)
*F26B 17/04* (2006.01)
*F26B 23/00* (2006.01)
*F26B 23/10* (2006.01)

(52) U.S. Cl.
CPC .............. *F26B 23/00* (2013.01); *F26B 23/10* (2013.01); *F24F 2003/144* (2013.01)

(58) Field of Classification Search
USPC .......................................................... 34/408
See application file for complete search history.

(56) References Cited

U.S. PATENT DOCUMENTS

| | | | | |
|---|---|---|---|---|
| 5,823,340 | A * | 10/1998 | Maihofer | A61L 11/00 206/370 |
| 6,158,147 | A * | 12/2000 | Smith | F26B 21/001 34/168 |
| 2012/0015924 | A1 * | 1/2012 | Friesen | B01J 2/04 514/180 |
| 2015/0175716 | A1 * | 6/2015 | Robinson | F26B 5/065 34/284 |

FOREIGN PATENT DOCUMENTS

| | | | | |
|---|---|---|---|---|
| CN | 103822450 | | 5/2014 | |
| CN | 206056194 | | 3/2017 | |
| CN | 106766730 | | 5/2017 | |
| CN | 207963423 | | 10/2018 | |
| EP | 2581403 | | 4/2013 | |
| FR | 2672116 | A1 * | 7/1992 | ............ F26B 21/06 |

* cited by examiner

CONTINUOUS DRYING APPARATUS FOR BEE POLLEN AND RELATED DRYING METHOD

CROSS-REFERENCE

This application is a national stage application of PCT/CN2018/090284 filed on Jun. 7, 2018, which claims the priority to Chinese Patent Application No. 2018101465485, entitled "Continuous drying apparatus for bee pollen and related drying method", filed on Feb. 12, 2018. The disclosure of each of the foregoing applications is incorporated herein by reference in its entirety.

TECHNICAL FIELD

The present invention relates to the technical field of bee product processing, in particular to a continuous drying apparatus for bee pollen and related drying method.

BACKGROUND ART

Bee pollen is derived from nature, and is an irregular oblate lump formed by adding special gland secretions to pollen grains or nectar collected by bees and mixing the resultant. As the source of plant life, bee pollen contains all the nutritional ingredients and active substances for plant development, and it is often called "micro-nutrition library". The total production of bee pollen in China is the highest in the world. However, due to restrictions on the conditions such as post-harvest preservation, drying, storage and transportation often causes beekeepers to reduce the amount of bee pollen harvested. After fresh bee pollen is harvested, the moisture content is as high as 20% to 30% in wet basis, the activities of microorganisms and enzymes are very high, and it needs to be dried in time, otherwise, the bee pollen will rapidly ferment and deteriorate, the active ingredients will be lost, and the market value will be lost. Therefore, in the harvesting season, timely drying of fresh bee pollen is an essential way to avoid the deterioration of bee pollen quality and prolong its shelf life.

Currently, there are marry drying methods for bee pollen such as sun hot air drying, ventilation drying, electrothermal drying, drying by heated brick bed and the like. However, these methods are generally difficult to effectively protect the nutritional ingredients and active substances in the bee pollen as they are easy to cause fat oxidation, color change and the like during the drying process, thereby causing poor quality of the dried bee pollen.

In addition, low energy utilization and high energy consumption are commonly existed for these drying methods, which leads to high cost of the drying processing of the bee pollen.

SUMMARY OF THE INVENTION

(1) Technical Problems to be Solved

The object of the present invention is to provide a continuous drying apparatus for bee pollen and related drying method, so as to solve the technical problems in the prior art that: drying operation is difficult to automate due to the inability to continuously dry bee pollen; at the same time, the drying operation lacks a heat energy recycling system, and the drying processing link cannot be optimally adjusted according to the change of the moisture content of the bee pollen material at different drying periods, as a result, the energy consumption for drying bee pollen is high and the production cost is increased; and not only lipid oxidation, color change and the like, but also uneven drying occur during the drying process, thereby resulting in poor quality of the dried bee pollen.

(2) Technical Solutions

In order to solve the above technical problems, according to a first aspect of the present invention, provided is a continuous drying apparatus for bee pollen, comprising: a box body, on which a bee pollen feed port and a bee pollen discharge port are respectively constructed, a partition plate is disposed inside the box body, and the partition plate separates the inner chamber of the box body into an upper chamber and a lower chamber, wherein the free end of the partition plate forms an opening together with the side wall of the box body; a first drying conveying structure disposed in the upper chamber for heating the bee pollen to be dried fell from the bee pollen feed port, and conveying the heated bee pollen in a direction close to the opening; a second drying conveying structure disposed in the lower chamber for heating the bee pollen fell from the opening, and conveying the heated dried bee pollen in a direction close to the bee pollen discharge port; and a heat pump dehumidification heating structure, wherein the gas inlet of the heat pump dehumidification heating structure is connected with the lower chamber, and the gas outlet of the heat pump dehumidification heating structure is connected with the upper chamber.

Wherein, the first drying conveying structure comprises a first heating plate disposed on a lower surface of the top wall of the box body and capable of performing first-stage heating to the bee pollen to be dried.

Wherein, the first drying conveying structure further comprises a first main drive roller and a first driven roller respectively disposed on the front side wall and/or the rear side wall of the box body, and a first conveyor belt which is sleeved on outer side of the first main drive roller and the first driven roller at both ends, respectively, and is capable of conveying the bee pollen to be dried, wherein a first drive motor is disposed on the first main drive roller, and the first conveyor belt is disposed below the first heating plate.

Wherein, the second drying conveying structure comprises a second heating plate disposed on a lower surface of the partition plate and capable of performing second-stage heating to the first-stage heated bee pollen.

Wherein, the second drying conveying structure further comprises a second main drive roller and a second driven roller respectively disposed on the front side wall and/or the rear side wall of the box body, and a second conveyor belt which is sleeved on outer side of the second main drive roller and the second driven roller at both ends, respectively, and is capable of transporting the first-stage heated bee pollen, wherein a second drive motor is disposed on the second main drive roller, and the second conveyor belt is disposed below the second heating plate.

Wherein, the continuous drying apparatus for bee pollen further comprises a first guide plate capable of guiding the first-stage heated bee pollen from the first conveyor belt to the second conveyor belt, the first guide plate being disposed inside the upper chamber through a first horizontal plate, wherein the plane of the first guide plate is parallel to the tangential direction of the first-stage heated bee pollen discharge.

Wherein, the continuous drying apparatus for bee pollen further comprises a finished product bin disposed below the box body and capable of receiving the dried bee pollen and the finished product bin is connected with the bee pollen discharge port of the box body through a quick connector.

Wherein, the continuous drying apparatus for bee pollen further comprises a second guide plate capable of guiding the dried bee pollen from the second conveyor belt to the finished product bin, the second guide plate is disposed inside the lower chamber through a second horizontal plate, wherein the plane of the second guide plate is parallel to the tangential direction of the dried bee pollen discharge.

Wherein, the heat pump dehumidification heating structure comprises an evaporator, a fan and a condenser which are sequentially connected, wherein the gas inlet of the evaporator is connected with the lower chamber through a first pipeline, and the gas outlet of the condenser is connected with the upper chamber through a second pipeline.

Wherein, the continuous drying apparatus for bee pollen further comprises a vacuum pump and a gas storage device, wherein the vacuum pump is connected with the internal chamber of the box body through a first pressure pipeline, and the gas storage device is connected with the internal chamber of the box body through a second pressure pipeline.

Wherein, the continuous drying apparatus for bee pollen further comprises a raw material bin disposed on the box body, the raw material bin comprises a bin body having a lower end embedded in the bee pollen feed port, a first opening is constructed at the upper end of the bin body, and a second opening is constructed at the lower end of the bin body, wherein the lower end of the bin body is constructed as adduction structure Wherein, a cover body capable of covering the first opening is disposed at the upper end of the bin body, and a transparent observation zone is constructed in the middle portion of the cover body.

Wherein, an annular groove is constructed at the upper edge of the first opening, and a sealing strip is embedded in the annular groove.

Wherein, an adjustment groove having an opening downward is constructed on the inclined surface of the adduction structure, and a baffle plate that can slide up and down along the longitudinal direction of the adjustment groove is provided in the adjustment groove.

Wherein, a fastener capable of fixing the baffle plate is provided on the adjustment groove.

According to a second aspect of the present invention, provided is a method for drying bee pollen, comprising: vacuumizing the internal chamber of the box body; injecting an inert gas into the internal chamber of the box body after the vacuumizing operation; starting the heat pump dehumidification heating structure, and at the same time, conveying the bee pollen to be dried to the first drying conveying structure for first-stage drying, thereby performing the preliminary dehydration operation on the bee pollen to be dried; conveying the bee pollen after the preliminary dehydration operation to the second drying conveying structure for second-stage drying to obtain dried bee pollen; and collecting the dried bee pollen in a closed finished product bin filled with inert gas to complete the drying operation.

(3) Beneficial Effects

The continuous drying apparatus for bee pollen provided by the invention has at least one of the following advantages as compared with the prior art:

The heat pump dehumidification heating structure is started when drying the bee pollen to be dried, and the heat pump dehumidification heating structure can dehumidify and heat the bee pollen to be dried. Specifically, the heat pump dehumidification heating structure can effectively reduce the humidity in the inner chamber of the box body, and at the same time, it can recycle the latent heat and sensible heat in the dried exhaust gas, thereby greatly improving the energy utilization rate. However, since the heat pump dehumidification heating structure belongs to medium-low temperature drying, the temperature rises slowly in the early stage of drying, and thus, in order to accelerate the drying temperature of the bee pollen to be dried, the bee pollen fell from the bee pollen feed port is heated by the first drying conveying structure, and the heated bee pollen is conveyed in a direction close to the opening, and at the same time, the bee pollen fell from the opening is heated by the second drying conveying structure, and the heated dried bee pollen is conveyed in a direction close to the bee pollen discharge port. Thus, the present application achieves continuous drying of bee pollen by means of belt-type material conveying, thereby greatly increasing the drying rate of the bee pollen to be dried. In addition, it should be noted that during the drying process of the bee pollen to be dried, the whole drying process is in a closed-loop drying system, which is beneficial to retain the volatile components in the bee pollen and improve the product quality of the bee pollen. The heat transfer medium is usually an inert gas, thereby effectively reducing the degree of oxidative degradation of the biologically active substances of the bee pollen. In the later storage process of bee pollen, the storage medium of the finished product bin is an inert gas, which will greatly reduce the adverse effects caused by oxygen, microorganisms and humidity on the quality of the products.

Finally, the thickness of the material to be dried is adjusted by the cooperation of the baffle plate of the raw material bin and the conveyor belt to achieve thin layer drying, and the belt-type drying also effectively increases the drying area, increases the drying rate and shorten the drying time. The materials will automatically flip during the belt-type conveying process, which effectively overcomes the uneven drying of the materials, and is beneficial to improving the quality of the dried product. The present invention relates to a novel drying apparatus which combines conduction, radiation, convection and thin layer drying, and is suitable not only for drying bee pollen but also for drying processing of other heat sensitive materials.

The reference signs in the figures represent the meanings as follows, 1: box body; 11: bee pollen feed port; 12: bee pollen discharge port; 2: partition plate; 1a: upper chamber; 1b: lower chamber; 3: first drying conveying structure; 31: first heating plate; 32: first main drive roller; 33: first driven roller; 34: first conveyor belt; 4: second conveying structure; 41: second heating plate; 42: second main drive roller; 43:

second driven roller; 44: second conveyor belt; 5: heat pump dehumidification heating structure; 51: condenser; 52: fan; 53: evaporator; 6: first guide plate; 7: finished product bin; 8: second guide plate; 9: vacuum pump; 10: gas storage device; 20: raw material bin; 21: bin body; 22: cover body; 23: sealing strip; 24: adjustment groove; and 25: baffle plate.

SPECIFIC MODES FOR CARRYING OUT THE EMBODIMENTS

The specific embodiments of the present invention are further described in detail below with reference to the drawings and Examples. The following Examples are intended to illustrate the present invention but are not intended to limit the scope of the present invention.

In the description of the present invention, it should be noted that the terms "installation", "connected", and "in communication with" are to be understood in the general meanings, for example, it may be fixed connection, detachable connection, or integral connection; it may be mechanical connection or electrical connection; and it can be direct connection or indirect connection through an intermediate medium, and it can be the internal connection of two components. The specific meaning of the above terms in the present invention can be understood in a specific meaning by a person skilled in the art.

Example 1

Figure 1:
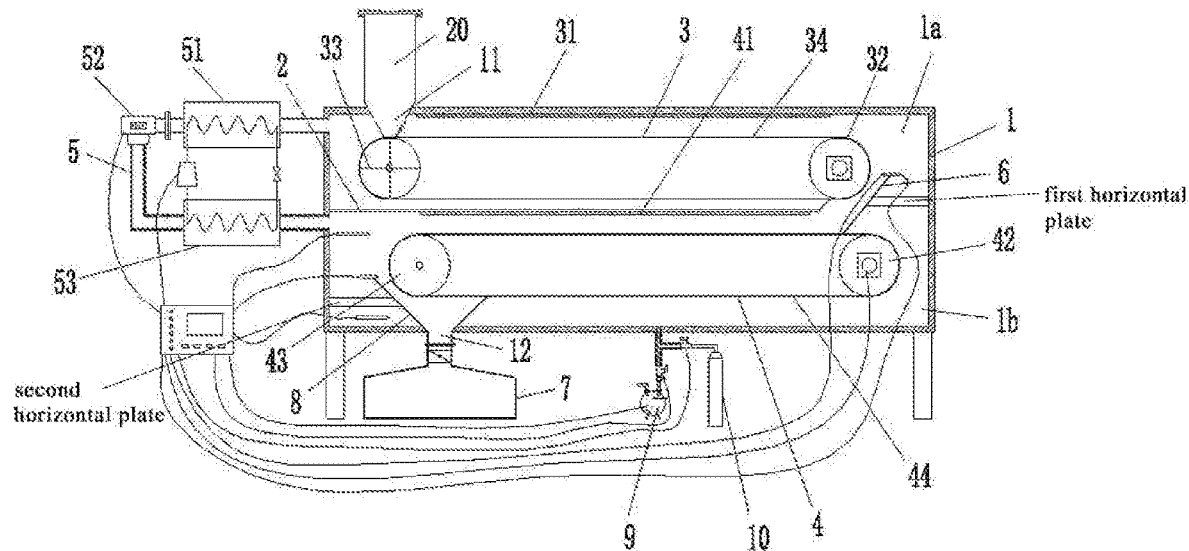
FIG. 1 is a schematic view showing the overall structure of the continuous drying apparatus for bee pollen according to an Example of the present application.

As shown in FIG. 1, the figure schematically shows that the continuous drying apparatus for bee pollen comprises: a box body 1, a partition plate 2, a first drying conveying structure 3, a second drying conveying structure 4, and a heat pump dehumidification heating structure 5.

In the Example of the present application, a bee pollen feed port 11 and a bee pollen discharge port 12 are respectively constructed on the box body 1, a partition plate 2 is disposed inside the box body 1, and the partition plate 2 separates the inner chamber of the box body 1 into an upper chamber 1a and a lower chamber 1b, wherein the free end of the partition plate 2 forms an opening together with the side wall of the box body 1. It should be noted that, the "opening" is commonly constructed by the free end of the partition plate 2, the front side wall, the rear side wall and the right side wall of the box body 1.

In addition, it should be noted that the partition plate 2 needs to have a certain rigidity so as to support and install the second heating plate 41 as described below.

The first drying conveying structure 3 is disposed in the upper chamber 1a for heating the bee pollen to be dried fell from the bee pollen feed port 11, and conveying the heated bee pollen in a direction close to the opening.

The second drying conveying structure 4 is disposed in the lower chamber 1b for heating the bee pollen fell from the opening, and conveying the heated dried bee pollen in a direction close to the bee pollen discharge port 12.

The gas inlet of the heat pump dehumidification heating structure 5 is connected with the lower chamber 1b, and the gas outlet of the heat pump dehumidification heating structure is connected with the upper chamber 1a. Specifically, the heat pump dehumidification heating structure 5 is started when drying the bee pollen to be dried, and the heat pump dehumidification heating structure 5 can dehumidify and heat the bee pollen to be dried. Specifically, the heat pump dehumidification heating structure 5 can effectively reduce the humidity in the inner chamber of the box body 1, and at the same time, it can recycle the latent heat and sensible heat in the dried exhaust gas, thereby greatly improving the energy utilization rate. However, since the heat pump dehumidification heating structure 5 belongs to medium-low temperature drying, the temperature rises slowly in the early stage of drying, and thus, in order to accelerate the drying temperature of the bee pollen to be dried, the bee pollen fell from the bee pollen feed port 11 is heated by the first drying conveying structure 3, and the heated bee pollen is conveyed in a direction close to the opening, and at the same time, the bee pollen fell from the opening is heated by the second drying conveying structure 4, and the heated dried bee pollen is conveyed in a direction close to the bee pollen discharge port 12. Thus, the present application achieves continuous drying of bee pollen by means of belt-type material conveying, thereby greatly increasing the heating rate of the bee pollen to be dried. In addition, it should be noted that during the drying process of the bee pollen to be dried, the heat transfer medium is usually an inert gas (for example, nitrogen, helium, argon or helium and the like), thereby effectively reducing degree of oxidative degradation of the biologically active substances of the bee pollen. In the later storage process of bee pollen, the storage medium of the finished product bin is inert gas, which will greatly reduce the adverse effects caused by oxygen, microorganisms and humidity on the quality of the products. Furthermore, the above heat transfer medium may also be carbon dioxide.

In addition, it should be noted that the present application is suitable not only for drying bee pollen, but also for drying and dehydrating treatment of other heat sensitive particle materials.

As shown in FIG. 1, the figure schematically shows that the first drying conveying structure 3 comprises: a first heating plate 31 disposed on a lower surface of the top wall of the box body 1 and capable of performing first-stage heating to the bee pollen to be dried. Specifically, the bee pollen to be dried is heated by the first heating plate 31, so that the temperature of the bee pollen to be dried can be quickly increased, so that the bee pollen can be dehydrated as quickly as possible.

In order to further optimize the first drying conveying structure 3 in the above technical solution, on the basis of the above technical solution, the first drying conveying structure 3 further comprises a first main drive roller 32 and a first driven roller 33 respectively disposed on the front side wall and/or the rear side wall of the box body 1, and a first conveyor belt 34 which is sleeved on outer side of the first main drive roller 32 and the first driven roller 33 at both ends, respectively, and is capable of conveying the bee pollen to be dried. A first drive motor is disposed on the first main drive roller 32, and the first conveyor belt 34 is disposed below the first heating plate 31. Specifically, the first main drive roller 32 is driven to rotate circumferentially by the first drive motor, and the rotation of the first conveyor belt 34 is driven by the rotation of the first main drive roller 32, and further, the rotation of the first driven roller 33 is driven by the rotation of the first conveyor belt 34. Thus, when the bee pollen to be dried falls from the bee pollen feed port 11 onto the first conveyor belt 34, it is conveyed in the direction of the opening (not shown) while being heated.

Furthermore, by arranging the first conveyor belt 34 below the first heating plate 31, the heating surface area of the bee pollen to be dried can be increased, and the drying efficiency of the bee pollen to be dried can be improved.

As shown in FIG. 1, in a preferred embodiment of the present application, the second drying conveying structure 4 comprises a second heating plate 41 disposed on the lower surface of the partition plate 2 and capable of performing second-stage heating to the first-stage heated bee pollen. Specifically, the second heating plate 41 can further heat the first-stage heated bee pollen, so that the drying efficiency of the bee pollen can be further improved. It should be noted that, in the process of heating the bee pollen, different heating temperatures can be set for the first heating plate 31 and the second heating plate 41, respectively, thereby achieving the purpose of heating the bee pollen to different temperatures in different drying stages.

In a specific example, the first heating plate 31 and the second heating plate 41 may both be carbon fiber electric heating plates.

In order to further optimize the second drying conveying structure 4 in the above technical solution, on the basis of the above technical solution, the second drying conveying structure 4 further comprises a second main drive roller 42 and a second driven roller 43 respectively disposed on the front side wall and/or the rear side wall of the box body 1, and a second conveyor belt 44 which is sleeved on outer side of the second main drive roller 42 and the second driven roller 43 at both ends, respectively, and is capable of transporting the first-stage heated bee pollen, a second drive motor is disposed on the second main drive roller 42, and the second conveyor belt 44 is disposed below the second heating plate 41. It should be noted that, the advantage of disposing the second conveyor belt 44 below the second heating plate 41 is the same as that of disposing the first conveyor belt 34 below the first heating plate 31, and for the sake of space saving, it will not be described in detail here.

In addition, it should be noted that the rotation direction of the first main drive roller 32 is opposite to the rotation direction of the second main drive roller 42. Thus, it is ensured that the dried bee pollen can be accurately and timely transported to the bee pollen discharge port 12 after the second-stage heating of the bee pollen, and further, it is convenient to collect the dried bee pollen into the finished product bin 7, thereby completing the drying operation of the bee pollen.

As shown in FIG. 1, in a preferred example, the continuous drying apparatus for bee pollen further comprises a first guide plate 6 capable of guiding the first-stage heated bee pollen from the first conveyor belt 34 to the second conveyor belt 44, the first guide plate 6 being disposed inside the upper chamber 1a through a first horizontal plate, wherein the plane of the first guide plate 6 is parallel to the tangential direction of the first-stage heated bee pollen discharge. Specifically, the arrangement of the first guide plate 6 can ensure that the first-stage heated bee pollen is accurately and smoothly fell onto the second conveyor belt 44, thereby avoiding falling onto the bottom wall of the box body 1 and resulting in waste of the bee pollen.

Figure 4:
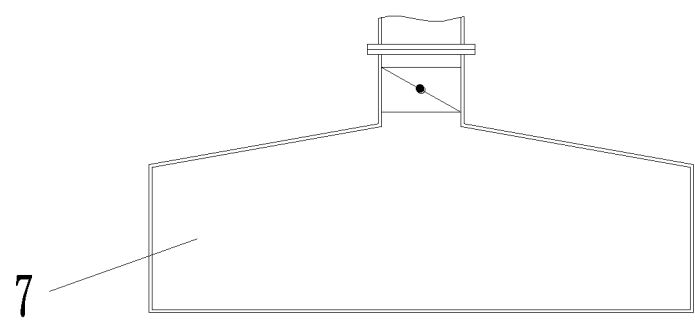
FIG. 4 is a schematic view showing the overall structure of the finished product bin of FIG. 1.

As shown in FIG. 1 and FIG. 4, the figures also schematically show that the continuous drying apparatus for bee pollen further comprises a finished product bin 7 disposed below the box body 1 and capable of receiving the dried bee pollen, and the finished product bin 7 is connected with the bee pollen discharge port 12 of the box body 1 through a quick connector. It should be noted that, a valve is provided in the finished product bin 7, so that the sealing property of the finished product bin 7 can be ensured, and at the same time, the valve in the finished product bin 7 is always open during the process of drying the bee pollen, and thus, a part of the inert gas injected into the box body 1 through the gas storage device as described below is also injected into the finished product bin 7, and after the dried bee pollen is collected in the finished product bin 7, the valve is closed, thereby achieving the sealed storage of dried bee pollen. Thus, in the later storage of dried bee pollen, the adverse effects caused by oxygen, microorganisms and humidity on the quality of the product will be greatly reduced.

As shown in FIG. 1, the figure also schematically shows that the continuous drying apparatus for bee pollen further comprises a second guide plate 8 capable of guiding the dried bee pollen from the second conveyor belt 44 to the finished product bin 7, and the second guide plate 8 is disposed inside the lower chamber 1b through a second horizontal plate, wherein the plane of the second guide plate 8 is parallel to the tangential direction of the dried bee pollen discharge. Specifically, the arrangement of the second guide plate 8 can ensure that the second-stage heated dried bee pollen is accurately and smoothly conveyed to the bee pollen discharge port 12, thereby preventing the dried bee pollen from falling onto the bottom wall of the box body 1 thereby avoiding the waste of the bee pollen.

In a specific example, the first guide plate 6 and the second guide plate 8 can be made of stainless steel 304L, and its thickness can be 2 mm to 3 mm, and a food grade silicone layer is installed on the inclined plane of the first guide plate 6 and the second guide plate 8, and the food grade silicone layer has a thickness of 3 mm to 6 mm.

In one embodiment, the heat pump dehumidification heating structure 5 comprises an evaporator 53, a fan 52 and a condenser 51 which are sequentially connected, wherein the gas inlet of the evaporator 53 is connected with the lower chamber 1b through a first pipeline, and the gas outlet of the condenser 51 is connected with the upper chamber 1a through a second pipeline. Thus, it is possible to ensure that a closed circulation path is formed by the internal chamber of the box body 1 and the inside of the heat pump dehumidification heating structure 5, and at the same time, it is possible to dehumidify and heat the internal chamber of the box body 1.

As shown in FIG. 1, the continuous drying apparatus for bee pollen further comprises a vacuum pump 9 and a gas storage device 10, wherein the vacuum pump 9 is connected with the internal chamber of the box body 1 through a first pressure pipeline, and the gas storage device 10 is connected with the internal chamber of the box body 1 through a second pressure pipeline. It should be noted that, before drying the bee pollen to be dried, the internal chamber of the box body 1 can be evacuated by starting the vacuum pump 9, and when the vacuum pressure monitored by a pressure sensor (not shown) in the internal chamber of the box body 1 reaches 4 kPa, a solenoid valve disposed on the first pressure pipeline is closed, and the vacuum pump 9 is stopped. At this time, a solenoid valve disposed on the second pressure pipeline is opened, and an inert gas is input into the internal chamber of the box body 1 through the gas storage device 10, when the pressure of the internal chamber of the box body 1 reaches the standard atmospheric pressure, the pressure sensor transmits a signal to an automatic controller (not shown), and the solenoid valve is immediately closed. At this time, the first drive motor is started, and at the same time, the first heating plate 31 is started to heat up, and the fan 52 is started to operate.

Figure 2:
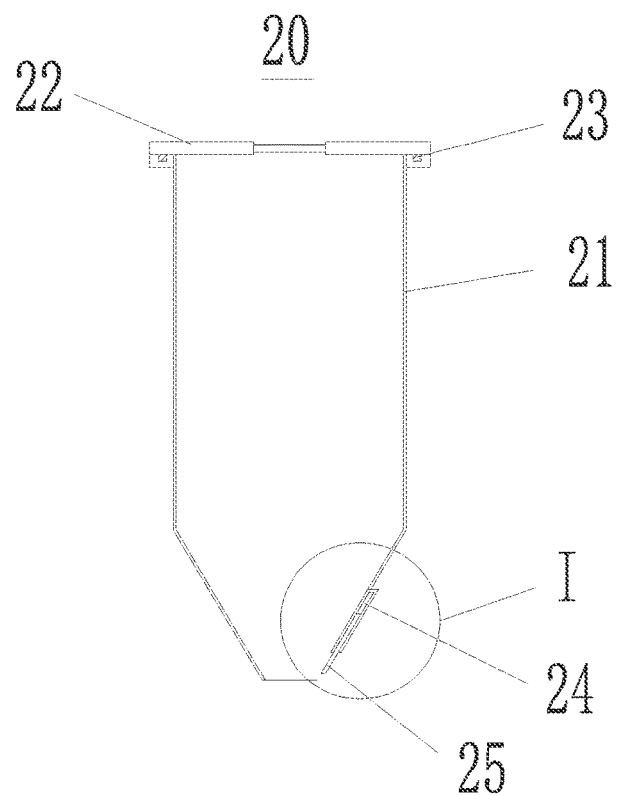
FIG. 2 is a schematic view showing the overall structure of the raw material bin of FIG. 1.

As shown in FIG. 1 and FIG. 2, the figures schematically show that the continuous drying apparatus for bee pollen further comprises a raw material bin 20 disposed on the box body 1, and the raw material bin 20 comprises a bin body having a lower end embedded in the bee pollen feed port 11, a first opening is constructed at the upper end of the bin body 21, and a second opening is constructed at the lower end of the bin body, wherein the lower end of the bin body 21 is constructed as adduction structure. Specifically, by constructing the lower end of the bin body 21 into the adduction structure, the conveyance of the bee pollen to be dried can be accelerated, and the case of arching during the conveyance of the bee pollen to be dried from the inside of the bin body 21 to the bee pollen feed port 11 is prevented.

In one example, a cover body 22 capable of covering the first opening is disposed at the upper end of the bin body 21, and a transparent observation zone is constructed in the middle portion of the cover body 22. It should be noted that, the inside of the bin body 21 can be in a relatively closed environment by the arrangement of the cover body 22, thereby preventing outside air, dust, moisture and the like from entering the inside of the bin body 21, and further ensuring that the quality of the bee pollen to be dried in the bin body 21 will not be affected by the external environment. In addition, the arrangement of the transparent observation zone enables to conveniently observe the material level of the bee pollen to be dried and the condition of the discharging, and at the same time, the bee pollen to be dried can be added to the interior of the bin body 21 in real time according to the change of the material level, thereby achieving continuous operation of drying the bee pollen to be dried.

In one example, an annular groove (not shown) is constructed at the upper edge of the first opening, and a sealing strip 23 is embedded in the annular groove. Specifically, by adding the sealing strip 23, the sealing property between the cover body 22 and the bin body 21 can be greatly improved.

Figure 3:
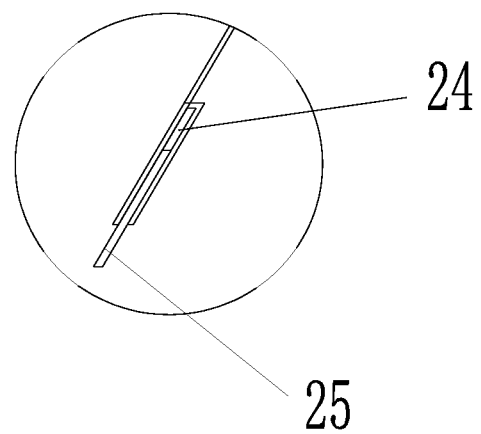
FIG. 3 is a schematic view showing locally amplified structure of I of FIG. 2.

As shown in FIG. 2 and FIG. 3, the figures also schematically show that an adjustment groove 24 having an opening downward is constructed on an inclined surface of the adduction structure, and a baffle plate 25 that can slide up and down along the longitudinal direction of the adjustment groove 24 is provided in the adjustment groove 24. It should be noted that, since the moisture contents of the bee pollen to be dried are not the same, in order to improve the drying efficiency of the bee pollen to be dried, the purpose of adjusting the thickness of the bee pollen to be dried can be achieved by the cooperation of the baffle plate and the first conveyor belt 34, and furthermore, the thin layer drying of the bee pollen can be achieved, that is, the purpose of adjusting the thickness of the bee pollen to be dried fell from the bee pollen feed port 11 onto the first conveyor belt 34 can be achieved. In addition, belt-type thin layer drying can effectively increase the drying area, increase the drying rate, and shorten the drying time. In addition, the bee pollen to be dried will automatically flip during the belt-type conveying process, so that the defects of drying unevenness of the bee pollen to be dried can be effectively overcome, and the quality of the bee pollen to be dried is advantageously improved.

In another example, a fastener (not shown) capable of fixing the baffle plate 25 is provided on the adjustment groove 24. It should be noted that, the arrangement of the fastener enables to flexibly fix the position of the baffle plate 25. It should be noted that, the fastener may be a bolt, a screw or a latch.

Figure 5:
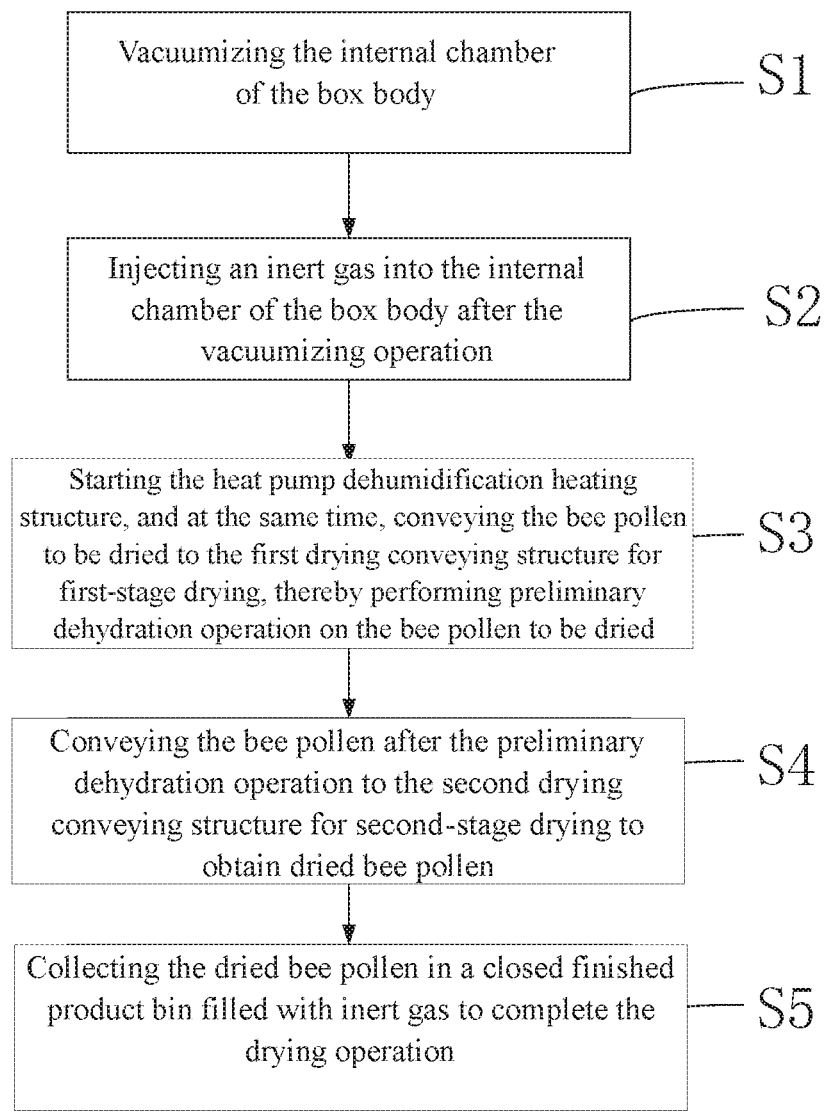
FIG. 5 is a flow chart showing the steps of the method for drying bee pollen according to an Example of the present application.

As shown in FIG. 5, according to a second aspect of the present application, a method for drying bee pollen is further provided, comprising:

Step S1, the internal chamber of the box body 1 is vacuumized.

Step S2, an inert gas is injected into the internal chamber of the box body 1 after the vacuumizing operation.

Step S3, the heat pump dehumidification heating structure 5 is started, and at the same time, the bee pollen to be dried is conveyed to the first drying conveying structure 3 for first-stage drying, thereby performing preliminary dehydration operation on the bee pollen to be dried.

Step S4, the bee pollen after the preliminary dehydration operation is conveyed to the second drying conveying structure 4 for second-stage drying to obtain dried bee pollen.

Step S5, the dried bee pollen is collected in a closed finished product bin 7 filled with inert gas to complete the drying operation. Specifically, the finished product bin 7 is connected to the box body 1, and the valve is opened. The baffle plate 25 is adjusted to adjust the thickness of the bee pollen to be dried to 6 mm to 12 mm, and the bee pollen to be dried is added to the raw material bin 20, and the cover body 22 is closed. Then, the power is turned on, an automatic controller (not shown) is started, the operating speed of the first conveyor belt 34 and the second conveyor belt 44 is set to 5 mm/min to 60 mm/min, the temperature of the first heating plate 31 and the second heating plate 41 is set to 45 to 65 degrees, and the speed of the circulating gas flow is set to 0.5 m/sec to 2.5 m/sec. The vacuum pump 9 is started, a solenoid valve disposed on the first pressure pipeline is opened, and when the vacuum pressure monitored by the pressure sensor in the internal chamber of the box body 1 reaches 4 kPa, the solenoid valve is closed and the vacuum pump 9 is stopped. The solenoid valve disposed on the second pressure pipeline is opened, and the inert gas is input into the box body 1 through the gas storage device 10. When the pressure in the box body 1 reaches the standard atmospheric pressure, a pressure sensor transmits a signal to an automatic controller, and the solenoid valve disposed on the second pressure pipeline is immediately closed. Then, the first drive motor is started, the first heating plate 31 is started to heat up, the fan 52 is started to operate, and the compressor (not shown) starts to work. When a first batch of bee pollen falls from the first conveyor belt 34 to the first guide plate 6, a photoelectric sensor (not shown) transmits a signal to the automatic controller, the second drive motor is started, and the second heating plate 41 is started to heat up. As the drying temperature rises, when a temperature sensor monitors that the temperature reaches the highest value of the set temperature, the powers of the first heating plate 31 and the second heating plate 41 are cut off by the automatic controller, as the drying process progresses, when the temperature sensor monitors that the temperature reaches the minimum value of the set temperature, the powers of the first heating plate 31 and the second heating plate 41 are turned on by the automatic controller, thereby achieving precise temperature control during the drying process. After all of the bee pollen on the first conveyor belt 34 falls into the first guide plate 6, a photoelectric sensor transmits a signal to the automatic controller, and then the first drive motor and the first heating plate 31 automatically stop working. After all of the bee pollen on the second conveyor belt 44 falls into the second guide plate 8, the photoelectric sensor transmits a signal to the automatic controller, and then the second drive motor, the second heating plate 41, the compressor, and the fan 52 stop working, the drying of the bee pollen is completed, the valve in the finished product bin 7 is closed, and the sealed finished product bin 7 is placed in a refrigerator for storage.

In summary, when drying the bee pollen to be dried, the heat pump dehumidification heating structure 5 is started, and the heat pump dehumidification heating structure 5 can dehumidify and heat the bee pollen to be dried. Specifically, the heat pump dehumidification heating structure 5 can effectively reduce the humidity in the inner chamber of the box body 1, and can also recycle the latent heat and sensible heat in the dried exhaust gas, thereby greatly improving the energy utilization rate. However, since the heat pump dehumidification heating structure 5 belongs to medium-low temperature drying, the temperature rises slowly in the early stage of drying, and thus, in order to accelerate the drying temperature of the bee pollen to be dried, the bee pollen fell from the bee pollen feed port 11 is heated by the first drying conveying structure 3, and the heated bee pollen is conveyed in a direction close to the opening, and at the same time, the bee pollen fell from the opening is heated by the second drying conveying structure 4, and the heated dried bee pollen is conveyed in a direction close to the bee pollen discharge port 12. Thus, the present application achieves continuous drying of bee pollen by means of belt-type material conveying, thereby greatly increasing the drying rate of the bee pollen to be dried. In addition, it should be noted that, during the drying process of the bee pollen to be dried, the heat transfer medium is usually an inert gas, thereby effectively reducing the degree of oxidative degradation of the biologically active substances of the bee pollen. In the later storage process of bee pollen, the storage medium of the finished product bin 7 is inert gas, which will greatly reduce the adverse effects caused by oxygen, microorganisms and humidity on the quality of the products.

The above are only the preferred examples of the present invention, and they are not intended to limit the present invention. Any modifications, equivalent substitutions, improvements and the like made within the spirit and scope of the present invention are intended to be included within the scope of protection of the present invention.

What is claimed is:

1. A continuous drying apparatus for bee pollen, comprising:
   a box body, on which a bee pollen feed port and a bee pollen discharge port are respectively constructed, a partition plate is disposed inside the box body, and the partition plate separates the inner chamber of the box body into an upper chamber and a lower chamber, wherein the free end of the partition plate forms an opening together with the side wall of the box body;
   a first drying conveying structure disposed in the upper chamber for heating the bee pollen fallen from the bee pollen feed port to be dried, and conveying the heated bee pollen in a direction close to the opening;
   a second drying conveying structure disposed in the lower chamber for heating the bee pollen fallen from the opening, and conveying the heated dried bee pollen in a direction close to the bee pollen discharge port; and
   a heat pump dehumidification heating structure, wherein the gas inlet of the heat pump dehumidification heating structure is connected with the lower chamber, and the gas outlet of the heat pump dehumidification heating structure is connected with the upper chamber;
   wherein the first drying conveying structure comprises a first heating plate disposed on a lower surface of the top wall of the box body and capable of performing first-stage heating to the bee pollen fallen from the bee pollen feed port to be dried;
   wherein the first drying conveying structure further comprises a first main drive roller and a first driven roller respectively disposed on a front side wall and/or a rear side wall of the box body, and a first conveyor belt which is mounted on an outer side of the first main drive roller and the first driven roller at both ends, respectively, and is capable of conveying the bee pollen to be dried,
   wherein a first drive motor is disposed on the first main drive roller, and the first conveyor belt is disposed below the first heating plate; and
   wherein the second drying conveying structure comprises a second heating plate disposed on a lower surface of the partition plate and capable of performing second-stage heating to the first-stage heated bee pollen.

2. The continuous drying apparatus for bee pollen according to claim 1, wherein the second drying conveying structure further comprises a second main drive roller and a second driven roller respectively disposed on the front side wall and/or the rear side wall of the box body, and a second conveyor belt which is mounted on an outer side of the second main drive roller and the second driven roller at both ends, respectively, and is capable of transporting the first-stage heated bee pollen, wherein a second drive motor is disposed on the second main drive roller, and the second conveyor belt is disposed below the second heating plate.

3. The continuous drying apparatus for bee pollen according to claim 2, wherein the continuous drying apparatus for bee pollen further comprises a first guide plate capable of guiding the first-stage heated bee pollen from the first conveyor belt to the second conveyor belt, the first guide plate being disposed inside the upper chamber through a first horizontal plate, wherein the plane of the first guide plate is parallel to the tangential direction of the first-stage heated bee pollen discharge.

4. The continuous drying apparatus for bee pollen according to claim 2, wherein the continuous drying apparatus for bee pollen further comprises a finished product bin disposed below the box body and capable of receiving the dried bee pollen, and the finished product bin is connected with the bee pollen discharge port of the box body through a quick connector.

5. The continuous drying apparatus for bee pollen according to claim 4, wherein the continuous drying apparatus for bee pollen further comprises a second guide plate capable of guiding the dried bee pollen from the second conveyor belt to the finished product bin, and the second guide plate is disposed inside the lower chamber through a second horizontal plate, wherein the plane of the second guide plate is parallel to the tangential direction of the dried bee pollen discharge.

6. The continuous drying apparatus for bee pollen according to claim 1, wherein the heat pump dehumidification heating structure comprises an evaporator, a fan and a condenser which are sequentially connected, wherein the gas inlet of the evaporator is connected with the lower chamber through a first pipeline, and the gas outlet of the condenser is connected with the upper chamber through a second pipeline.

7. The continuous drying apparatus for bee pollen according to claim 1, wherein the continuous drying apparatus for bee pollen further comprises a vacuum pump and a gas storage device, wherein the vacuum pump is connected with the internal chamber of the box body through a first pressure pipeline, and the gas storage device is connected with the internal chamber of the box body through a second pressure pipeline.

8. The continuous drying apparatus for bee pollen according to claim 1, wherein the continuous drying apparatus for bee pollen further comprises a raw material bin disposed on the box body, the raw material bin comprises a bin body having a lower end embedded in the bee pollen feed port, a first opening is constructed at the upper end of the bin body, and a second opening is constructed at a lower end of the bin body, wherein the lower end of the bin body is constructed as adduction structure.

9. The continuous drying apparatus for bee pollen according to claim 8, wherein a cover body capable of covering the first opening is disposed at the upper end of the bin body, and a transparent observation zone is constructed in the middle portion of the cover body.

10. The continuous drying apparatus for bee pollen according to claim 8, wherein an annular groove is constructed at the upper edge of the first opening, and a sealing strip is embedded in the annular groove.

11. The continuous drying apparatus for bee pollen according to claim 8, wherein an adjustment groove having an opening downward is constructed on an inclined surface of the adduction structure, and a baffle plate that can slide up and down along the longitudinal direction of the adjustment groove is provided in the adjustment groove.

12. The continuous drying apparatus for bee pollen according to claim 11, wherein a fastener capable of fixing the baffle plate is provided on the adjustment groove.

13. A method of drying bee pollen using the continuous drying apparatus for bee pollen according to claim 1, comprising:

vacuuming the internal chamber of the box body;

injecting an inert gas into the internal chamber of the box body after the vacuuming operation;

starting the heat pump dehumidification heating structure, and at the same time, conveying the bee pollen to be dried to the first drying conveying structure for first-stage drying, thereby performing preliminary dehydration operation on the bee pollen to be dried;

conveying the bee pollen after the preliminary dehydration operation to the second drying conveying structure for second-stage drying to obtain dried bee pollen; and collecting the dried bee pollen in a closed finished product bin filled with inert gas to complete the drying operation.

14. The continuous drying apparatus for bee pollen according to claim 2, wherein the heat pump dehumidification heating structure comprises an evaporator, a fan and a condenser which are sequentially connected, wherein the gas inlet of the evaporator is connected with the lower chamber through a first pipeline, and the gas outlet of the condenser is connected with the upper chamber through a second pipeline.

* * * * *